US009925881B2

(12) United States Patent
Manotas, Jr.

(10) Patent No.: US 9,925,881 B2
(45) Date of Patent: Mar. 27, 2018

(54) VEHICLE BI-DIRECTIONAL POWER INVERTER SYSTEM AND METHOD

(71) Applicant: Panasonic Automotive Systems Company of America, Division of Panasonic Corporation of North America, Peachtree City, GA (US)

(72) Inventor: Jesus Manotas, Jr., Peachtree City, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/370,644

(22) Filed: Dec. 6, 2016

(65) Prior Publication Data

US 2017/0080811 A1  Mar. 23, 2017

Related U.S. Application Data

(63) Continuation of application No. 12/712,493, filed on Feb. 25, 2010, now Pat. No. 9,545,851.

(51) Int. Cl.
*H02J 7/00* (2006.01)
*B60L 11/18* (2006.01)
(Continued)

(52) U.S. Cl.
CPC ....... *B60L 11/1812* (2013.01); *B60L 11/1816* (2013.01); *B60L 11/1842* (2013.01); *B60L 11/1844* (2013.01); *B60L 11/1846* (2013.01); *B60L 11/1848* (2013.01); *B60L 2210/30* (2013.01); *B60L 2230/16* (2013.01); *H02J 3/32* (2013.01); *H02J 3/38* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01);
(Continued)

(58) Field of Classification Search
USPC ......................................................... 320/128
See application file for complete search history.

(56) References Cited

U.S. PATENT DOCUMENTS

| 2008/0052145 | A1* | 2/2008 | Kaplan | G06Q 10/0631 705/7.12 |
| 2008/0185197 | A1* | 8/2008 | Nakamura | B60K 6/445 180/65.28 |
| 2008/0203973 | A1* | 8/2008 | Gale | B60L 11/1816 320/157 |

* cited by examiner

*Primary Examiner* — Robert Grant
(74) *Attorney, Agent, or Firm* — Laurence S. Roach, Esq.

(57) ABSTRACT

An exemplary embodiment of the present invention provides a bi-directional inverter of a vehicle. The bi-directional inverter may include an alternating current (AC) to direct current (DC) inverter configured to receive AC power from a power grid and generate DC power on a DC bus operatively coupled to a vehicle battery. The bi-directional inverter may also include a DC to AC inverter configured to receive DC power from the DC bus and generate AC power delivered to the power grid. The bi-directional inverter may also include an energy management system operatively coupled to the AC to DC inverter and the DC to AC inverter and configured to selectively operate the bi-directional inverter in a charging mode or a generation mode. Additionally, the bi-directional inverter may include a power line communications (PLC) coupler configured to transfer electronic data between the energy management system and a power plant network through the power grid.

20 Claims, 2 Drawing Sheets

(51) Int. Cl.
   *H02J 3/32*    (2006.01)
   *H02J 3/38*    (2006.01)
(52) U.S. Cl.
   CPC .............. *Y02T 90/16* (2013.01); *Y02T 90/163* (2013.01); *Y02T 90/169* (2013.01); *Y04S 10/126* (2013.01); *Y04S 30/14* (2013.01)

VEHICLE BI-DIRECTIONAL POWER INVERTER SYSTEM AND METHOD

CROSS-REFERENCE TO RELATED APPLICATION

This application is a continuation of U.S. patent application Ser. No. 12/712,493, filed on Feb. 25, 2010, which is now U.S. Pat. No. 9,545,851, issued on Jan. 17, 2017, the disclosure of which is hereby incorporated by reference in its entirety for all purposes.

FIELD OF THE INVENTION

The present invention generally relates to a power system for a vehicle. More specifically, the present invention relates to a power system for a vehicle that includes circuitry for selectively receiving power from an electrical power grid or generating electrical power to be delivered to the power grid. The power system can also be communicatively coupled to a power plant network through the electrical grid.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electric vehicles have increased in popularity in recent years. Electric vehicles and plug-in hybrid electric vehicles may be useful for reducing dependency on fossil fuels and increasing fuel efficiency. Electric and plug-in electric vehicles generally receive electrical power through a power grid provided by an electric utility. Thus, a typical electric vehicle may include an AC to DC inverter for receiving AC power from the grid to charge the vehicle battery.

SUMMARY OF THE INVENTION

An exemplary embodiment of the present invention provides a bi-directional inverter of a vehicle. The bi-directional inverter may include an alternating current (AC) to direct current (DC) inverter configured to receive AC power from a power grid and generate DC power on a DC bus operatively coupled to a vehicle battery. The bi-directional inverter may also include a DC to AC inverter configured to receive DC power from the DC bus and generate AC power delivered to the power grid. The bi-directional inverter may also include an energy management system operatively coupled to the AC to DC inverter and the DC to AC inverter and configured to selectively operate the bi-directional inverter in a charging mode or a generation mode. Additionally, the bi-directional inverter may include a power line communications (PLC) coupler configured to transfer electronic data between the energy management system and a power plant network through the power grid.

In some embodiments, the bi-directional inverter may include a second PLC coupler communicatively coupled to a vehicle network, the vehicle network configured to receive electronic communications from the power plant network through the power grid. In such embodiments, a user interface operatively coupled to the vehicle network and configured to enable a user to interface with the energy management system. Interfacing with the energy management system may include generating a charge/generation schedule based, at least in part, on an electricity rate provided by the power plant network through the power grid and storing the charge/generation schedule to the energy management system. Furthermore, in some embodiments, the electronic communications between the power plant network, the vehicle network, and the energy management system are conducted through a TCP/IP-based communications protocol.

In some exemplary embodiments, the energy management system is configured to automatically generate a charge/generation schedule based, at least in part, on electricity rates received from the power plant network through the power grid. In some exemplary embodiments, an input of the AC to DC inverter is operatively coupled to a vehicle AC generator electrically that is coupled in series between the power grid and the AC to DC inverter and configured to power the DC bus through the AC to DC inverter. In some exemplary embodiments, the DC to AC inverter comprises a DC switching circuit configured to generate a sinusoidal output waveform.

Another exemplary embodiment of the present invention provides a vehicle that includes a battery configured to provide power to a vehicle propulsion system. The vehicle also includes an AC to DC inverter configured to receive AC power from a power grid and generate DC power on a DC bus. The vehicle also includes a DC to AC inverter configured to receive DC power from the DC bus and generate AC power delivered to the power grid. The vehicle also includes an energy management system operatively coupled to the AC to DC inverter and the DC to AC inverter and configured to selectively operate the bi-directional inverter in a charging mode or a generation mode. Furthermore, the energy management system is configured to communicate with a power plant network through the power grid.

In some exemplary embodiments, the vehicle may also include a vehicle network communicatively coupled to the power grid for communicating with the power plant network and the energy management system. In such embodiments, a first PLC coupler may be configured to transfer electronic data between the energy management system and the power grid and a second PLC coupler may be configured to transfer electronic data between the vehicle network and the power grid. Furthermore, the electronic communications between the power plant network, the vehicle network, and the energy management system may be conducted through a TCP/IP-based communications protocol.

In some exemplary embodiments, the vehicle may include a user interface communicatively coupled to the vehicle network, wherein the user interface may be used to initiate the charging mode and the generation mode through the energy management system. In some exemplary embodiments, the user interface may be configured to display information received from the power plant network, the information including an electricity rate schedule. In some exemplary embodiments, a global positioning system (GPS) navigation system is communicatively coupled to the vehicle network and configured to send travel data to the energy management system, wherein the energy management system is configured to automatically determine a charge/generation schedule, based, at least in part, on the travel data.

Another exemplary embodiment of the present invention provides a method of managing power usage in a vehicle. The method may include receiving electronic data from a power plant network through a power grid and switching a power system of the vehicle to a generation mode or charging mode based, at least in part, on the electronic communications received from the power plant network through the power grid. The generation mode causes the vehicle to draw DC electrical power from a vehicle battery and generate an AC output power delivered to the power grid. The charging mode causes the vehicle to draw AC electrical power from the power grid and generate DC electrical power for charging the vehicle battery. In such exemplary embodiments, the receiving the electronic data may include receiving an electricity rate from the power plant network or receiving an instruction from the power plant network instructing the power system of the vehicle to initiate or terminate a charge mode or generation mode depending, at least in part, on a combined electrical demand on the power grid.

In some exemplary embodiments, the method may include determining a charge/generation schedule based, at least in part, on an electricity rate schedule provided by the power plant network through the power grid. In some exemplary embodiments, the method may include switching a power system of the vehicle to a generation mode or charging mode based, at least in part, on input provided by a user through a user interface communicatively coupled to the power grid.

BRIEF DESCRIPTION OF THE DRAWINGS

The above-mentioned and other features and advantages of the present invention, and the manner of attaining them, will become apparent and be better understood by reference to the following description of one embodiment of the invention in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting in any manner the scope of the invention.

DETAILED DESCRIPTION OF THE PREFERRED EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Exemplary embodiments of the present invention relate to a power system for an electric vehicle, for example, a plug-in hybrid electric vehicle, and the like. The power system may include a bi-direction inverter that is capable of operating in a charging mode and a generation mode. During the charging mode the bi-direction inverter provides AC to DC conversion for charging a vehicle battery(s) from an electrical grid. During generation mode the bi-direction inverter provides DC to AC conversion for generating power that is delivered back to the electrical grid. The power system may also include control circuitry for selectively switching the power system between the charging mode and a generation mode. Additionally, the power system may communicate with a communications network of an electricity provider to receive a variety of information, such as electricity rates. Information received from the communications network may be used by the control circuitry to determine whether to operate the power system in the charging mode or generation mode. Furthermore, the power system may include PLC circuitry that enables the power system to communicate with the communications network through an electrical power grid such as Smart Grid. As used herein, the term "Smart Grid" is used to refer to an electrical grid that enables an electric utility to manage power usage of devices coupled to the electrical grid by communicating with the devices through the electrical grid.

Figure 1:
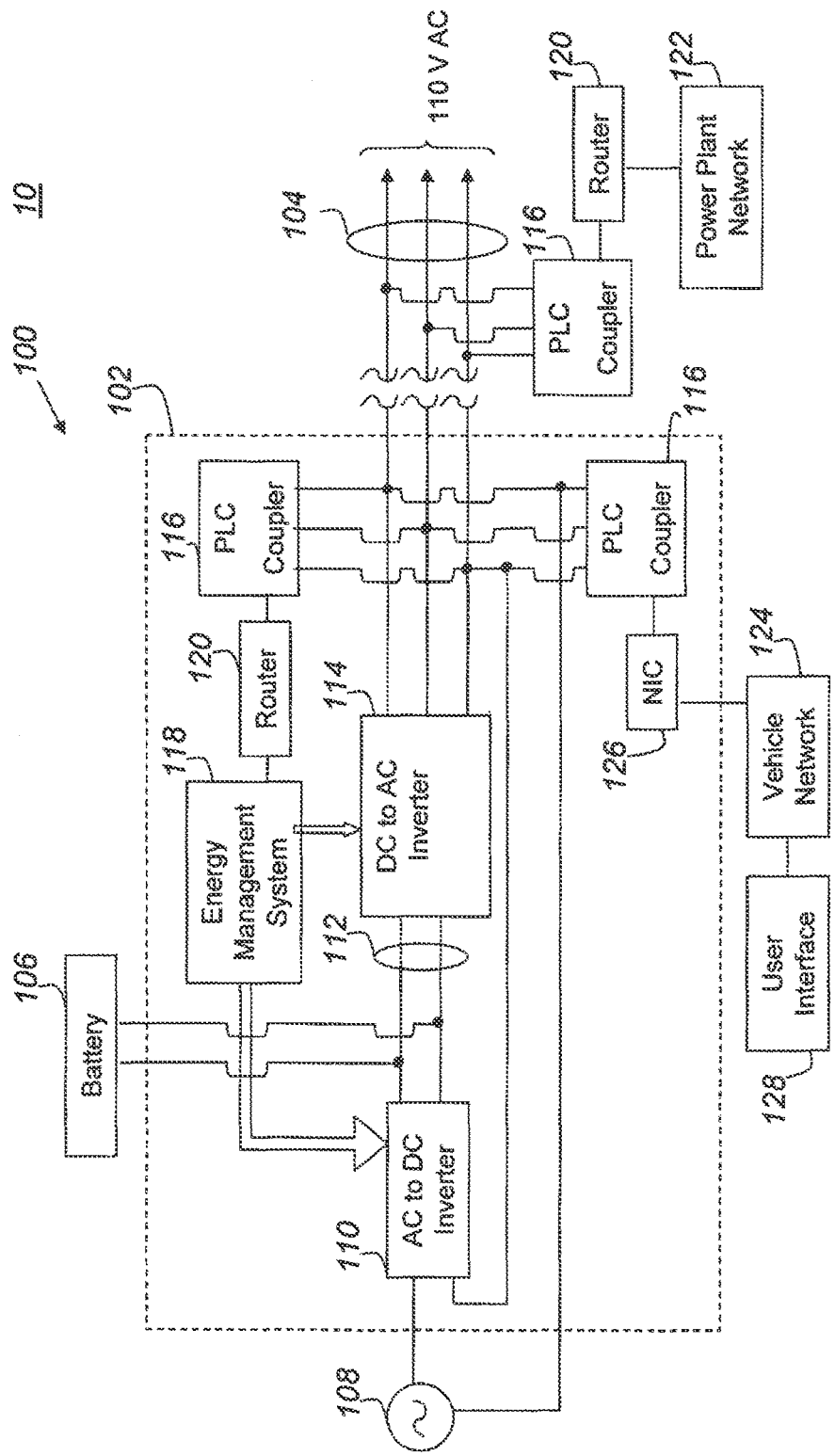
FIG. 1 is a block diagram of a vehicle power system 100 with a bi-directional inverter 102, in accordance with an exemplary embodiment of the present invention.

FIG. 1 is a block diagram of a vehicle power system 100 with a bi-directional inverter 102, in accordance with an exemplary embodiment. The bi-directional inverter 102 may be coupled to a power grid 104. Accordingly, the bi-directional inverter 102 may include an electrical connector that enables the user of the vehicle to couple the power system 100 to the power grid 104 when the vehicle is stationary. The power grid 104 may be any suitable electrical distribution network provided, for example, by an electric power utility or other electrical generation and distribution facility. In some embodiments, the electrical grid may be a Smart Grid that provides electrical power as well as electronic communications.

The bi-directional inverter 102 may be coupled to a vehicle battery 106 that is used to store energy used by a vehicle propulsion system such as an electric motor. The vehicle battery 106 may be any suitable vehicle battery, for example, a 420 Volt lithium fluoride battery. Furthermore, the vehicle battery 106 may include a plurality of batteries. The bi-directional inverter 102 may also be coupled to a vehicle AC generator 108, such as an alternator, which may generate single-phase AC power used to charge the battery 106, for example, when the vehicle is mobile. Additionally, when the vehicle in coupled to the power grid 104 and operating in generation mode, the vehicle AC generator 108 may be used to provide the electrical power that is delivered to the power grid 104.

The bi-directional inverter 102 may include an AC to DC inverter 110, for converting AC power received from the power grid 104 or the vehicle AC generator 108 into DC electrical power that is delivered to a DC bus 112. The AC to DC inverter 110 may include any suitable circuitry for converting AC power into DC power, for example, a step-up transformer, a rectifier, and the like. In some embodiments, the AC to DC inverter 110 may include a switched-mode power supply, a silicon-controlled rectifier (SCR) for a crowbar protection circuit, a bridge rectifier, and the like. In a switched-mode configuration, the AC to DC inverter 110 may include solid-state switches such as metal-oxide semiconductor field-effect transistors (MOSFETs) for a DC boost circuit. The AC to DC inverter 110 may also include circuitry for reducing noise on the DC bus 112, for example, capacitors, inductors, and the like. The input of the AC to DC inverter 110 may be coupled to the power grid 104 through a single-phase 110 Volt electrical connection, as shown in FIG. 1, which is generally available in most vehicle garages. However, various other electrical configurations may also be used to couple the AC to DC inverter 110 to the power grid 104. Additionally, an input of the AC to DC inverter 110 may also be coupled to the output of the vehicle AC generator 108 in a single-phase configuration, as shown in FIG. 1. The output of the AC to DC inverter 110 may be coupled to the DC bus 112, which is also coupled to the battery 106. During charge mode, the AC to DC inverter 110 receives AC power from the power grid 104 and provides DC power to the DC bus 112 for charging the vehicle battery 106.

The bi-directional inverter 102 may also include a DC to AC inverter 114 for generating AC power that may be delivered to the power grid 104. The DC to AC inverter 114 may include any suitable AC inverter for converting the DC power provided by the DC bus 112 into AC power that may be delivered to the electrical grid 104. For example, the DC to AC inverter 114 may include an SCR inverter, a insulated gate bipolar transistor (IGBT) inverter, a silicon-carbide Field Effect Transistor (SiC FET) inverter, a gallium nitride Metal Semiconductor Field Effect Transistors (GaN MESFET) inverter, as well as other rectifiers that utilize high-power semiconductor switching devices. In some embodiments, the DC to AC inverter 114 may be pulse width modulated. In such embodiments, the DC to AC inverter 114 may generate a sinusoidal output waveform that may reduce electromagnetic interference in the bi-directional inverter 102 as compared to a square wave output. In this way, a signal-to-noise ratio of the electronic data transmitted over the power grid 104 or within the bi-directional inverter 102 may be reduced. The input of the DC to AC inverter 114 may be coupled to the output of the AC to DC inverter 110 through the DC bus 112. The output of the DC to AC inverter 114 may be optionally coupled to the power grid 104. During generation mode, the DC to AC inverter 114 may receive DC power from the DC bus 112 and deliver AC power to the power grid 104. For example, the DC to AC generator may provide 2 to 10 Kilowatt, 110 Volt AC power to the power grid 104. Furthermore, during generation mode, the DC bus 112 may be powered by the battery 106 or the vehicle AC generator 108.

A number of PLC coupler 116 in the bi-directional inverter 102 may serve as a data interface between the power grid 104 and various electronic devices included in the bi-directional inverter 102. The PLC coupler 116 may provide high-speed data transmission over the power grid 104, for example, 200 to 400 megabit per second. In some exemplary embodiments, the PLC coupler 116 may comprise an HD-PLC coupler available from Panasonic Corporation. Communication between the power grid 104 and the devices in the bi-directional inverter 102 may be based on any of a large number of network technologies. The specific network technology chosen for a given application may vary based on design considerations for the specific application. By way of example, a TCP/IP communications protocol may be used. In some embodiments, a fixed Internet protocol (IP) address may be assigned to the vehicle. In this way, a user's vehicle may be easily identified through the power grid 104.

An energy management system 118 may be included in the bi-directional inverter 102 for controlling its operating mode. The energy management system 118 may include a processor, a tangible machine-readable memory, and other circuitry used to selectively switch the bi-directional inverter 102 to the charge mode or generation mode. Accordingly, the energy management system 118 may send control signals to the AC to DC inverter 110 and the DC to AC inverter 114. For example, the energy management system 118 may send switch control signals to the DC to AC inverter 114 to generate the AC power delivered to the power grid 104. Additionally, the energy management system 118 may send switch control signals to the AC to DC inverter 110 to generating the DC voltage output to the DC bus 112.

The energy management system 118 may be communicatively coupled to the power grid 104 through a PLC coupler 116. In some embodiments, a router 120 may pass data between the energy management system 118 and the PLC coupler 116. The router 120 may be an Ethernet router for transmitting TCP/IP packet information to and from the power grid 104 through the PLC coupler 116. The energy management system 118 may be communicatively coupled through the power grid 104 to a power plant network 122, which serves as a communications center of the power plant. The power plant network 122 may be communicatively coupled to the power grid 104 through another PLC coupler 116 and router 120 combination, as shown in FIG. 1.

Through the power grid 104, the energy management system 118 may receive data from the power plant network 122. For example, the energy management system 118 may receive data that relates to electrical rates, electricity availability, and the like. The energy management system 118 may use data received from the power plant network 122 to determine the operating mode of the bi-directional inverter 102. For example, the energy management system 118 may initiate the charge mode during off-peak electricity usage periods, during which the overall demand on the power grid 104 may be lower and the electricity rates may be reduced. The energy management system 118 may initiate generation mode during electrical shortages or during peak electricity usage periods, during which the demand on the power grid 104 may be higher and the electricity rates increased; thus, increasing the amount of money credited back to the customer.

In some exemplary embodiments, the energy management system 118 may also receive operational commands from the power plant network 122. For example, during electricity shortages the power plant network 122 may send commands to the energy management system 118 instructing the energy management system 118 to terminate the charge mode, activate the generation mode, or vice versa.

In some exemplary embodiments, the energy management system 118 may generate a log of various energy usage characteristics of the bi-directional inverter 102. For example, the log may include information such as battery charge history, energy usage history of the vehicle, and the like. The energy management system 118 log may also include details of prior charge/generation periods, such as the amount of power received from or delivered to the power grid 104, the electricity rates incurred from or charged to the electrical utility, and the like. Information in the log may be viewed by the vehicle user, as described below.

In some exemplary embodiments, the bi-directional inverter 102 may be coupled to a vehicle network 124. In some embodiments, the vehicle network 124 may include a PLC bus that uses a TCP/IP based communications protocol and provides both data communications and DC power to the devices coupled to the vehicle network 124. The vehicle network 124 may be coupled to the to the power grid 104 through a PLC coupler 116 and network interface controller (NIC) 126, as shown in FIG. 1. In some embodiments, the NIC 126 may be an Ethernet-over-power (EOP) adapter that provides data communications over the PLC bus.

The vehicle network 124 may provide connectivity between a variety of devices in the vehicle. For example, the vehicle network 124 may provide electronic communications between various media devices, such as a DVD player, a vehicle audio system, rear view camera, vehicle instrument cluster, global positioning system (GPS) navigation system, a wireless network, and the like. Additionally, the vehicle network 124 may also enable devices coupled to the vehicle network 124 to communicate with the energy management system 118 and the power plant network 122.

In some exemplary embodiments, the vehicle network 124 may be coupled to a user interface 128 that enables the vehicle user to manage the energy usage of the vehicle. In some exemplary embodiments, the user interface 128 may be provided in a vehicle infotainment interface. As used herein, the term "infotainment interface" refers to an in-vehicle information and entertainment system that combines a fixed user interface with information and entertainment sources located in the vehicle, such as a vehicle audio system, DVD player, GPS navigation system, and the like. In some embodiments, the user interface 128 may receive data from the power plant network 122 through the power grid 104. For example, the user interface 128 may receive data about current or future expected electricity rates, rate schedules, and the like. The user interface 128 may also receive information regarding the user's account with the electrical utility. For example, the user interface 128 may receive information such as an account statement, an amount due for electricity used or owed for electricity provided, and the like. The connection to the power plant network 122 may also enable the user to manage the account, for example, paying an outstanding balance, changing a rate plan, and the like.

In some exemplary embodiments, the user interface 128 may also be used to communicate with the energy management system 118 through the PLC coupler 116 coupled to the power grid 104. In some embodiments, the energy management system 118 may provide energy management data to the user interface 128. For example, the energy management system 118 may send data to the user interface 128 regarding the current operating mode of the bi-directional inverter 102, current battery charge, and the like. Additionally, the energy management data may include information stored to the log generated by the energy management system 118 as discussed above. In this way, the user may be able to view data related to the energy usage of the vehicle, for example, time and duration of previous charge/generation periods, the electricity rate applied during previous charge/generation periods, and the like.

The user interface 128 may also be used to manage a charge/generation schedule that may, at least in part, control when the energy management system 118 initiates or terminates the charge and generation modes. In such embodiments, the user may view a rate schedule provided by the power plant network 122, the rate schedule indicating the electricity rates charges for different days or different times of day. Based on this information and future expected energy needs, the user may manually create or alter the charge/generation schedule through the user interface 128. The charge/generation schedule may be stored to the energy management system 118. In some embodiments, the energy management system 118 may be generated automatically by the energy management system 118, based on the information provided by the power plant network 122. In such embodiments, the energy management system 118 may be configured to provide the optimize power usage, based on the electricity rates indicated by the power plant network 122. For example, the energy management system 118 may be configured to initiate the charging mode when rates are low and initiate the generation mode when rates are high.

In some exemplary embodiments, the energy management system 118 may also receive travel data from the instrument cluster or the GPS navigation system coupled to the vehicle network 124. For example, the travel data may include a recorded driving history, for example, information regarding prior trips such as distance, driving time, electricity usage, average speed, vehicle usage periods, and the like. The travel data may also include future trips, which may be received from a trip-planning feature of the GPS navigation system. The driving history and future trips may be used by the energy management system 118 to estimate future energy needs and automatically determine a charge/generation schedule that optimizes energy usage. For example, if the driving history or future trips suggest that the vehicle is likely to use a large amount of electricity, the energy management system 118 may compute a charge/generation schedule that provides a full battery charge when the vehicle will likely to be used. If the driving history or future trips suggest minimal vehicle usage such as short trips to and from work, the energy management system 118 may compute a charge/generation schedule that sells excess stored battery charge back to the power grid 104, for example, during peak electricity usage periods. The charge/generation schedule automatically generated by the energy management system 118 may also be manually altered by the user through the user interface 128.

Figure 2:
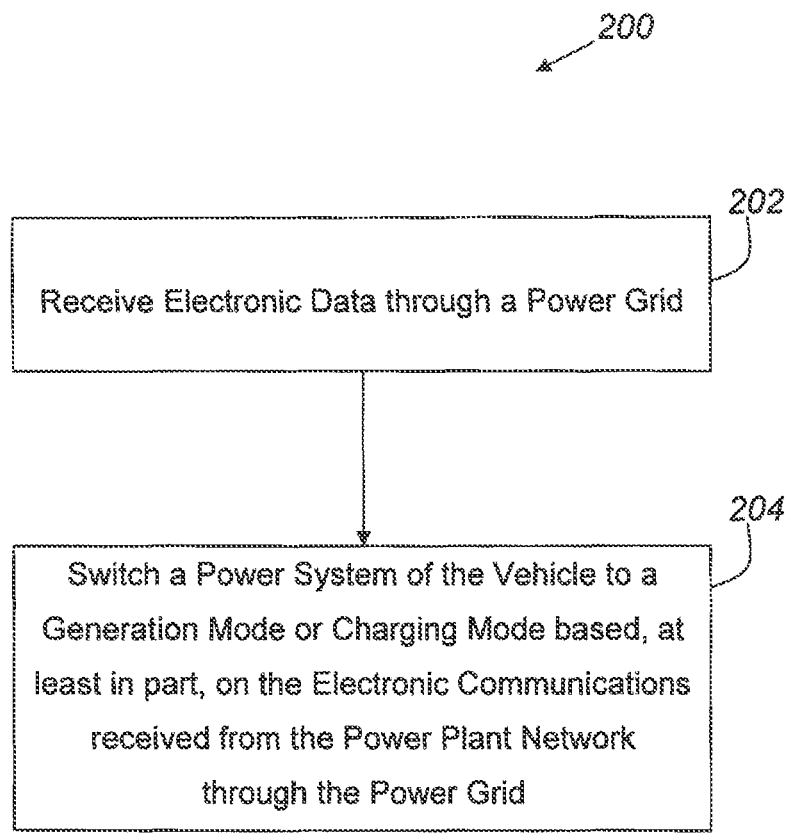
FIG. 2 is a process flow chart illustrating a method 200 for operating a power system of a vehicle, in accordance with an exemplary embodiment.

FIG. 2 is a process flow chart illustrating a method 200 for operating a power system of a vehicle, in accordance with an exemplary embodiment. The method may begin at block 202, wherein the bi-directional inverter 102 receives electronic data from the power plant network 122 through the power grid 104. For example, as discussed above, the bi-directional inverter 102 may receive information about electricity rates, such as the current electricity rate, an electricity rate schedule, and the like. In some embodiments, the bi-directional inverter 102 may receive instructions from the power plant network 122 that instruct the bi-directional inverter 102 to initiate or terminate the charge mode or generation mode. For example, the power plant may instruct the bi-directional inverter 102 to terminate charge mode or initiate generation mode if the combined demand on the power grid 104 exceeds the electrical generation capability of the power plant.

The process flow may then advance to block 204, wherein the bi-directional inverter 102 may be switched to a generation mode or charging mode based, at least in part, on the electronic communications received from the power plant network 122 through the power grid 104. For example, the bi-directional inverter 102 may switch to a generation mode or charging mode in response to a command from the power plant network 122 to switch to the corresponding mode. In embodiments wherein the data received from the power plant network 122 is a current electricity rate, the bi-directional inverter 102 may switch to a generation mode or charging mode based on the electricity rate. For example, if the current electricity rate rises above a specified threshold, the bi-directional inverter 102 may switch to a generation mode. Conversely, if the current electricity rate falls below a specified threshold, the bi-directional inverter 102 may switch to a charging mode. The specified thresholds may be specified by the user and programmed into energy management system 118. Furthermore, in embodiments wherein the data received from the power plant network 122 includes future electricity rates, the future electricity rates may be used to generate a charge/generation schedule, as discussed above in relation to FIG. 1. The energy management system 118 may then switch the bi-directional inverter to the charge mode or the generation mode in accordance with the charge/generation schedule.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A vehicle, comprising:
a vehicle power system including a bi-directional inverter, the bi-directional inverter having:
an alternating current (AC) to direct current (DC) inverter configured to receive AC power from a power grid and generate DC power on a DC bus operatively coupled to a vehicle battery;
a DC to AC inverter configured to receive DC power from the DC bus and generate AC power delivered to the power grid;
an energy management system operatively coupled to the AC to DC inverter and the DC to AC inverter and configured to selectively operate the bi-directional inverter in a charging mode or a generation mode; and
a power line communications (PLC) coupler configured to transfer electronic data between the energy management system and a power plant network through the power grid;
wherein the energy management system is configured to automatically generate a charge/generation schedule based, at least in part, on the electronic data received from the power plant network through the power grid.

2. The vehicle of claim 1, wherein the bi-directional inverter comprises a second PLC coupler communicatively coupled to a vehicle network, the vehicle network configured to receive electronic communications from the power plant network through the power grid.

3. The vehicle of claim 2, wherein the bi-directional inverter comprises a user interface operatively coupled to the vehicle network and configured to enable a user to interface with the energy management system.

4. The vehicle of claim 3, wherein interfacing with the energy management system comprises generating a charge/generation schedule based, at least in part, on the electronic data provided by the power plant network through the power grid and storing the charge/generation schedule to the energy management system.

5. The vehicle of claim 2, wherein the electronic communications between the power plant network, the vehicle network, and the energy management system are conducted through a TCP/IP-based communications protocol.

6. The vehicle of claim 1, wherein an input of the AC to DC inverter is operatively coupled to a vehicle AC generator electrically that is coupled in series between the power grid and the AC to DC inverter and configured to power the DC bus through the AC to DC inverter.

7. The vehicle of claim 1, wherein the DC to AC inverter comprises a switched-mode power supply configured to generate a sinusoidal output waveform.

8. The vehicle of claim 1, wherein the electronic data include rates of monetary costs of electricity.

9. A vehicle, comprising:
a vehicle power system including a bi-directional inverter, the bi-directional inverter having:
an alternating current (AC) to direct current (DC) inverter configured to receive AC power from a power grid and generate DC power on a DC bus operatively coupled to a vehicle battery;
a DC to AC inverter configured to receive DC power from the DC bus and generate AC power delivered to the power grid; and
an energy management system operatively coupled to the AC to DC inverter and the DC to AC inverter and configured to selectively operate the bi-directional inverter in a charging mode or a generation mode;
wherein the energy management system is configured to automatically generate a charge/generation schedule based, at least in part, on electricity rates received from a power plant network through the power grid.

10. The vehicle of claim 9, wherein the bi-directional inverter comprises a user interface operatively coupled to the vehicle network and configured to enable a user to interface with the energy management system.

11. The vehicle of claim 9, wherein an input of the AC to DC inverter is operatively coupled to a vehicle AC generator electrically that is coupled in series between the power grid and the AC to DC inverter and configured to power the DC bus through the AC to DC inverter.

12. The vehicle of claim 9, wherein the DC to AC inverter comprises a switched-mode power supply configured to generate a sinusoidal output waveform.

13. The vehicle of claim 9, further comprising a power line communications (PLC) coupler configured to transfer electronic data between the energy management system and the power plant network.

14. The vehicle of claim 13, wherein the electronic data include rates of monetary costs of electricity.

15. A vehicle, comprising:
a vehicle power system including:
an alternating current (AC) to direct current (DC) inverter configured to receive AC power from a power grid and generate DC power on a DC bus operatively coupled to a vehicle battery;
a DC to AC inverter configured to receive DC power from the DC bus and generate AC power delivered to the power grid;
an energy management system operatively coupled to the AC to DC inverter and the DC to AC inverter and configured to selectively operate the vehicle power system in a charging mode or a generation mode; and
a power line communications (PLC) coupler configured to transfer electronic data between the energy management system and a power plant network through the power grid;
wherein the energy management system is configured to automatically generate a charge/generation schedule based, at least in part, on electricity rates received from the power plant network through the power grid.

16. The vehicle of claim 15, wherein the vehicle power system comprises a second PLC coupler communicatively coupled to a vehicle network, the vehicle network configured to receive electronic communications from the power plant network through the power grid.

17. The vehicle of claim 16, wherein the vehicle power system comprises a user interface operatively coupled to the vehicle network and configured to enable a user to interface with the energy management system, and wherein the interfacing with the energy management system comprises generating a charge/generation schedule based, at least in part, on the electronic data provided by the power plant network through the power grid and storing the charge/generation schedule to the energy management system.

18. The vehicle of claim 16, wherein the electronic communications between the power plant network, the vehicle network, and the energy management system are conducted through a TCP/IP-based communications protocol.

19. The vehicle of claim 15, wherein an input of the AC to DC inverter is operatively coupled to a vehicle AC generator electrically that is coupled in series between the power grid and the AC to DC inverter and configured to power the DC bus through the AC to DC inverter.

20. The vehicle of claim 15, wherein the electronic data include rates of monetary costs of electricity.

* * * * *